Jan. 7, 1930.  L. L. NETTLETON ET AL  1,742,367
ELECTROMAGNETIC APPARATUS
Filed July 10, 1924

INVENTORS:
L. L. Nettleton and
H. C. Holt,
BY A. L. Vencill
Their ATTORNEY

Patented Jan. 7, 1930

1,742,367

UNITED STATES PATENT OFFICE

LEWIS L. NETTLETON, OF PITTSBURGH, AND HAROLD O. HOLTE, OF WILKINSBURG, PENNSYLVANIA, ASSIGNORS TO THE UNION SWITCH & SIGNAL COMPANY, OF SWISSVALE, PENNSYLVANIA, A CORPORATION OF PENNSYLVANIA

ELECTROMAGNETIC APPARATUS

Application filed July 10, 1924. Serial No. 725,127.

Our invention relates to electromagnetic apparatus, and has for an object the provision of means for controlling the delay of pick-up and release of an electromagnet.

We will describe several forms of apparatus embodying our invention, and will then point out the novel features thereof in claims.

Figure 1:
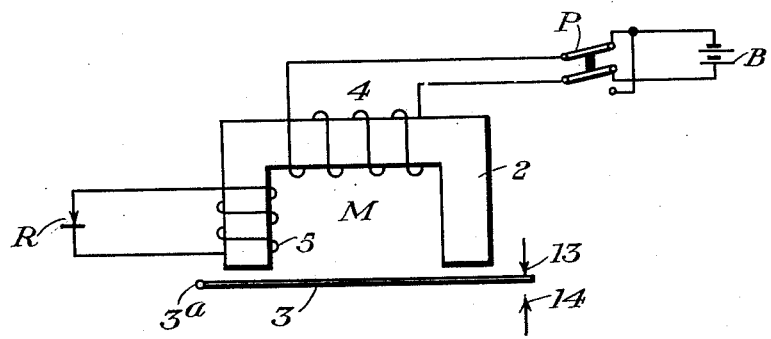
Figure 2:
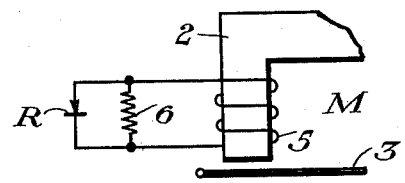
Figure 3:
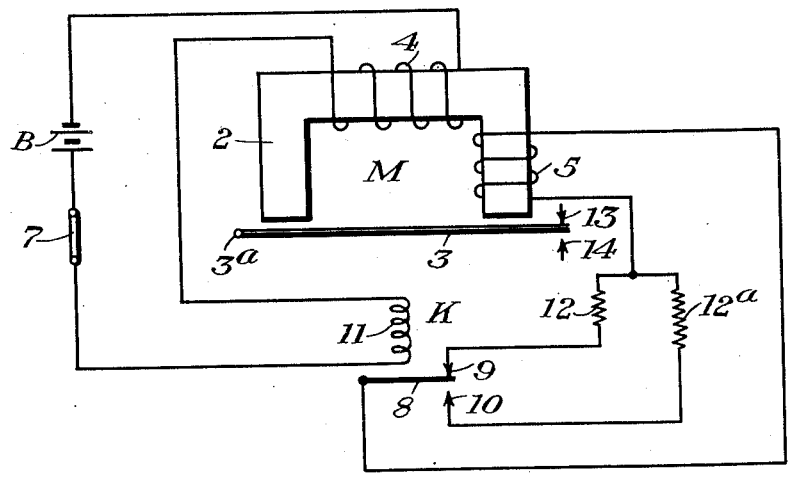

In the accompanying drawing, Fig. 1 is a view, partly diagrammatic, showing one form of apparatus embodying our invention. Fig. 2 is a fragmental view showing a modification of the apparatus shown in Fig. 1 and also embodying our invention. Fig. 3 is a view partly diagrammatic showing another form of apparatus embodying our invention.

Similar reference characters refer to similar parts in each of the several views.

Referring first to Fig. 1, the reference character M designates an electromagnet comprising a magnetizable core 2 provided with an operating winding 4. This magnet controls an armature 3 pivoted at point 3ª, which armature may be used for any suitable purpose; as here shown, this armature controls a front contact 13 and a back contact 14, so that this armature, together with the contacts and the operating magnet M constitute a relay. Operating current is supplied to the winding 4 by a battery B through a pole changer P. The magnet M is provided with an auxiliary winding 5 which is in inductive relation to the operating winding 4. As here shown, the windings 4 and 5 are spaced apart on the core 2, but this arrangement is only for purposes of clarifying the disclosure, it being understood that in actual practice the windings 4 and 5 will usually be superposed or otherwise wound in close inductive relation. The winding 5 is provided with a circuit which includes a unilateral cell R, that is, a cell having a higher resistance to current flowing in one direction than to current flowing in the other direction. The direction of relatively low conductivity is indicated by the arrow.

When the circuit for the operating winding 4 becomes closed, current starts to flow in this winding, and as this current increases it induces a voltage in the auxiliary winding 5. If the unilateral cell R is so connected that the current due to this voltage flows freely, the reaction of such current on the operating winding 4 will oppose the increase of current in the latter winding, and so will delay the building up of magnetic flux in the core 2, with the result that the pick-up of armature 3 will be delayed. When the circuit for the operating winding 4 is opened, the current in this winding will decrease, inducing a voltage in winding 5 in the opposite direction to that induced when the circuit for winding 4 was closed. The cell R will offer a relatively high resistance to the current due to this voltage so that the current in winding 5 will be relatively small and will have a relatively weak reaction on the other parts of the magnet. The decay of the magnetic flux will therefore be accomplished rapidly, so that the armature 3 will release almost as quickly as if the auxiliary winding 5 were not present.

By reversing the unilateral cell R in the circuit for winding 5, the effect of the winding 5 is reversed, so that it will have little or no reaction when the circuit for the operating winding 4 is closed, but will exert a relatively powerful reaction when the circuit for this winding is open. The result then will be that the armature 3 will be picked up quickly when the magnet becomes energized, but the release of the armature will be delayed when the magnet is de-energized.

The reversal of the delay period may likewise be accomplished by reversing the pole changer P, thereby reversing the polarity of the current supplied to the operating winding 4. When this current is of one polarity, the magnet will have the characteristics of delayed pick-up and quick release, whereas when the current in winding 4 is of the other polarity the magnet will have the characteristics of quick pick-up and delayed release.

In the modification shown in Fig. 2, a resistor 6 is connected across the unilateral cell R. This resistor will, of course, decrease the effect of the cell R, so that the lower the value of the resistor, the more nearly will the periods required for picking up and release of the armature 3 become the same. By varying the value of the resistor 6 the ratio of these periods may be adjusted to any desired value. The adjustment may be further controlled by an adjustable resistor in series with the auxiliary winding 5.

Referring now to Fig. 3, the magnet M and its armature 3 are the same as in Fig. 1, but the circuit for the auxiliary winding 5 is in this view controlled by a relay K having a winding 11, a front contact 8—9 and a back contact 8—10. Winding 11 of relay K is connected in series with the operating winding 4 of magnet M, the circuit for these two windings also including a battery B and a circuit controller 7. The circuit for auxiliary winding 5 has two branches; one branch includes a resistor 12 and the front contact 8—9 of relay K, while the other branch includes a resistor 12ᵃ and the back contact 8—10 of relay K.

We will first assume that resistor 12 is zero, and resistor 12ᵃ is infinite in value. Then when the circuit controller 7 is closed, relay K will immediately pick up and so will short circuit the auxiliary winding 5, thereby permitting the current induced in this winding by the operating winding 4 to flow freely. This will cause considerable delay in the building up of flux in the core of magnet M, so that the magnet will have a delayed pick-up characteristic. When circuit controller 7 is opened, relay K will release at once and so will open the circuit for the auxiliary winding 5, whereupon this winding will have little or no effect on the magnet M. The magnet will, consequently, release its armature with little or no more delay than if winding 5 were not present.

The opposite extreme would be to make the value of resistor 12 infinite and the value of resistor 12ᵃ zero. Then when circuit controller 7 becomes closed, the closing of relay K will place winding 5 on open circuit so that this winding will have little or no effect and the magnet M will pick up its armature with substantially no delay. When circuit controller 7 is opened, relay K will place the winding 5 on short circuit, so that this winding will then exert a powerful reaction with the result that the release of armature 3 will be delayed.

By giving resistors 12 and 12ᵃ intermediate values, the delay in the picking up and releasing of armature 3 by magnet M may be varied and adjusted in any way desired.

Although we have herein shown and described only a few forms of apparatus embodying our invention, it is understood that various changes and modifications may be made therein within the scope of the appended claims without departing from the spirit and scope of our invention.

Having thus described our invention, what we claim is:

1. In combination, an electromagnet having an operating winding supplied with direct current and an auxiliary winding in inductive relation to said operating winding, and a circuit for said auxiliary winding including an asymmetric resistance whereby said circuit offers different resistances to currents flowing in opposite directions.

2. In combination, an electromagnet having an operating winding supplied with direct current and an auxiliary winding in inductive relation to said operating winding, a circuit for said auxiliary winding including an asymmetric resistance, and a resistor associated with said circuit.

3. In combination, an electromagnet having an operating winding supplied with direct current and an auxiliary winding in inductive relation to said operating winding, a circuit for said auxiliary winding including an asymmetric resistance, and a resistor connected across the terminals of said cell.

In testimony whereof we affix our signatures.

LEWIS L. NETTLETON.
HAROLD O. HOLTE.